United States Patent [19]

Elkachouty

[11] Patent Number: 4,996,084

[45] Date of Patent: Feb. 26, 1991

[54] COLLOIDAL SILICA WATER BASED SLURRY SYSTEM FOR INVESTMENT CASTING SHELL BACKUP COATS

[75] Inventor: Ahmed A. Elkachouty, Wayne, N.J.

[73] Assignee: Pfizer Hospital Products Group, Inc., New York, N.Y.

[21] Appl. No.: 373,418

[22] Filed: Jun. 30, 1989

[51] Int. Cl.5 .............................................. B05D 3/00
[52] U.S. Cl. .................................. 427/133; 106/38.25; 106/38.35; 106/38.3; 106/38.6; 427/322; 427/419.3
[58] Field of Search ..................... 427/133, 322, 419.3; 106/38.25, 38.3, 38.6, 38.35

[56] References Cited

U.S. PATENT DOCUMENTS

| | | | |
|---|---|---|---|
| 2,806,270 | 9/1957 | Shaul | 427/133 |
| 2,990,292 | 6/1961 | Rempes | 427/133 |
| 3,748,156 | 7/1973 | Moore | 427/133 |
| 3,752,679 | 8/1973 | Moore | 427/133 |
| 3,752,680 | 8/1973 | Moore | 427/133 |
| 3,752,689 | 8/1973 | Moore | 427/133 |
| 3,752,689 | 8/1973 | Moore | 427/133 |
| 3,754,945 | 8/1973 | Moore | 427/133 |

*Primary Examiner*—Janyce Bell
*Attorney, Agent, or Firm*—Peter C. Richardson; Lawrence C. Akers; Raymond W. Augustin

[57] ABSTRACT

A water based slurry for use as backup coat on a wax model has colloidal silica and milled zircon as primary ingredients. The slurry is utilized as a backup coat on a wax model used in a lost wax investment casting technique. The slurry comprises of colloidal silica, a latex glue, ammonium alginate, a wetting agent, milled zircon, tabular alumina, glass rock and an anti-foaming agent.

4 Claims, No Drawings

COLLOIDAL SILICA WATER BASED SLURRY SYSTEM FOR INVESTMENT CASTING SHELL BACKUP COATS

Field of the Invention

This invention relates to the use of a water based slurry system for forming backup coats on an investment casting shell. More particularly, it relates to a colloidal silica water based slurry capable of forming a high strength backup coat for a wax model.

DESCRIPTION OF THE PRIOR ART

In accomplishing the lost wax investment casting technique, many foundries have used prime coats containing a water based slurry of colloidal silica. For quick drying purposes, a backup coat of ethyl silicate slurry has been used to produce a strong coating of the wax mold. Using this system, a finished part could be cast approximately 48 hours after the prime coat was applied to the wax model.

Although the shell system in use was attractive from a manufacturing standpoint, it did present environmental problems. The drying of the ethyl silicate alcohol based slurry resulted in the emission of large levels of organic compounds into the atmosphere. Environmental concerns relating to the effect of these organic compounds on the ozone in the upper atmosphere have led to attempts to eliminate their use in the casting technique.

The present invention, a colloidal silica water based slurry, is used for forming the shell backup coats. This new slurry system eliminates the emission of organic compounds into the atmosphere and provides a significant cost reduction in both labor and raw materials. The shell processing time for the water based slurry of the present invention was maintained to within 48-54 hours, which is comparable to the prior art alcohol based slurry system.

SUMMARY OF THE INVENTION

It is an object of the invention to provide a water based colloidal silica slurry that can be used as a backup coat in a lost wax casting system.

It is a further object of the invention to provide a water based slurry system which can be used as a backup coat which system can be substituted for the ethyl silicate alcohol based slurry systems currently utilized.

It is yet another object to provide a backup system in which the backup coat maintains the quality and strength of the finished casting and the drying time does not extend the production time over that produced with an alcohol based slurry.

These and related objects are achieved by a water based silica slurry having a viscosity of 10-14 Sec. as measured by a #5 Zahn Cup. This slurry is comprised of 30% colloidal silica binder (supplied by Dupont as a water mixture in 55 gallon drums) and includes a latex glue dissolved in the slurry. The slurry includes an ammonium alginate solution, a wetting agent and an anti-foaming agent all mixed into the slurry. Milled zircon flour, tabular alumina T-61 and glass rock are also added, in dry form, into the slurry. The viscosity of the slurry may be changed by varying the amount of the milled zircon and/or the colloidal silica content of the slurry. Increasing the amount of the milled zircon flour makes the slurry more viscous, as does decreasing the amount of 30% colloidal silica binder. Conversely, adding less milled zircon flour and more 30% colloidal silica binder decreases the viscosity.

These and other objects and features of the present invention will become apparent from the following detailed description, which discloses one embodiment of the invention.

DESCRIPTION OF THE PREFERRED EMBODIMENT

In a typical lost wax investment casting technique, wax models are first dipped in a prime coat of water based colloidal silica and then covered with a stucco which normally is a 120 mesh alundum sand. Optionally, a second prime coat may be utilized in which a coarser mesh sand is used as a stucco. Backup coats of a water based colloidal silica are then applied. It has been found that at least three to six backup coats are required to produce the necessary strength required for the final shell. However, up to eight backup coats may be applied as necessary. This number of backup coats produced a shell approximately 0.5 inches thick. Again, after each backup coat, the mold is covered with a stucco of tabular alumina, normally 14-28 mesh. A typical dipping process according to the invention is shown in Table 1, which process includes two prime coats and six backup coats.

TABLE 1

| Dip No. | Pre Wet | "A" Slurry | Drying Time-Hours | Visc. Sec. | (Zahn Cup) | Stucco and Mesh | |
|---|---|---|---|---|---|---|---|
| 1 | No | A-1 | 4 | 16-20 | #4 | Alundum | 120 |
| 2 | Yes (i) | A-2 | 4 | 15-18 | #4 | Alundum | 70 |
| 3 | Yes (i) | A-3 | 5 | 10-14 | #5 | Tab Alum | 28-48 |
| 4 | No | A-3 | 5 | 10-14 | #5 | Tab Alum | 14-28 |
| 5 | No | A-3 | 5 | 10-14 | #5 | Tab Alum | 14-28 |
| 6 | No | A-3 | 6 | 10-14 | #5 | Tab Alum | 14-28 |
| 7 | No | A-3 | 6 | 10-14 | #5 | Tab Alum | 14-28 |
| 8 | No | A-3 | 20 | 10-14 | #5 | — | — |

(i)Use Colloidal Silica as Prewet
Note:
A-1: Primary Face Coat
A-2: Primary Seal Coat
A-3: Colloidal Silica Back-Up Coat (Water Based)

In the preferred dipping procedure:

Handles were attached to the wax clusters and they were brought to the dip room where at least one-half hour was allowed for temperature homogenization. Any dust or wax flakes were cleaned off using compressed air. While dipping for the first dip (A-1 slurry), the assembly was immersed slowly and at a slight angle to let the air bubbles float up and allow complete coverage of the wax assembly. The cluster was taken out and the excess liquid was drained off. Any bubbles or films inside holes, serrated surfaces, threads, codes, catalog numbers and any other similar pockets were broken by blowing with light air and/or vibrating the assembly. The cluster was re-dipped in the slurry. The cluster was then taken out, excess liquid was drained while holding it on a vibrating block, and the cluster was rotated to make the liquid film uniform. The wet cluster was uniformly covered with 120 mesh alundum sand. After complete coverage, any excess sand which may have collected in the pockets was removed and the cluster was dried.

Before the second dip (A-2 slurry), any excess loose sand was removed and, optionally, the cluster was prewet, and dipped slowly in the slurry tank, ensuring complete coverage by the slurry. The cluster was then covered with 70 mesh alundum sand. After proper drying time and a prewet, if called for, the cluster was dipped in backup slurry (A-3), swirled around to cover it completely with slurry liquid, drained and stuccoed with 28–48 mesh tabular alumina in a fluidized bed. The procedure was repeated for the remaining coats as set forth in Table 1. After the last dip, the shell was allowed to dry for at least 20 hours.

While specific prime coats (slurry A-1 and A-2) are disclosed, the composition of the prime coats may vary from process to process. These alternate prime coats are well known to those skilled in the art. It is anticipated that the backup slurry of the present invention may be utilized on any prime coat previously used in the prior art. The preferred backup slurry consists of a mixture of 30% colloidal silica binder, obtained as a water/silica mixture in 55 gallon drums from Dupont, a latex glue such as Polyco 117H, ammonium alginate 1% solution, a wetting agent such as Victawet 12 and an anti-foaming agent such as DCA (6% solution by volume in chlorothene). To this mixture solids such as "G" milled zircon 325 mesh, tabular alumina T-61 (−28 +48 mesh) and glass rock P-1-W- (−200 +400 mesh) are added. All of the above ingredients are commercially available and well known to those skilled in the art.

The following Table 2 shows a typical list of ingredients and the quantities for producing approximately 30 gallons of slurry for the backup coating. The A-1, A-2 and A-3 slurries are all made from this basic recipe with the viscosities being varied to match those of Table 1.

TABLE 2

| Liquids/Suspensions | 30 Gal. |
| --- | --- |
| 30% Colloidal Silica Binder (Dupont) | 48820 cc (12.9 gal) |
| Polyco 117H (Latex Glue) | 6550 cc (1.73 gal) |
| Ammonium Alginate 1% Solution | 5500 cc (1.45 gal) |
| Victawet 12 (Wetting Agent) | 1750 cc (0.5 gal) |
| DCA (6% solution by volume in chlorothene) | 370 cc |
| solids | |
| "G" Milled Zircon 325 Mesh | 500 lb |
| Tabular Alumina T-61 (−28 +48 Mesh) | 100 lb |
| Glass Rock P-1-W (−200 +400 Mesh) | 20 lb |

It has been found that varying these quantities by + or − 10% has little effect on the shell's mechanical properties. Thus, the viscosity of the slurry can be changed by increasing or decreasing the quantities of 30 colloidal silica binder or milled zircon by up to 10% each from the volumes and weights given in Table 2. The addition of more 50% colloidal silica binder will result in a less viscous mixture because the binder is in a premixed silica suspension in water.

For batches with quantities other than 30 gallons, the ratio of ingredients are merely factored up or down, maintaining the proportions stated in Table 2. As stated above, the viscosity is controlled by changing the ratio of "G" milled zircon and the amount of colloidal silica binder. These viscosities are determined by the well known technique of utilizing a Zahn Cup.

Standard techniques for monitoring and maintaining the slurry should be utilized to insure that the proper viscosities are maintained throughout the process.

While one example of the present invention has been described, it is obvious that many changes and modifications may be made thereunto, without departing from the spirit and scope of the invention.

What is claimed is:

1. A water based slurry for use as a backup coat on a wax model utilized in the lost wax investment casting technique, the wax model having at least one prime coat, the water based slurry backup coat comprising a mixture of:
   colloidal silica binder;
   a latex glue;
   ammonium alginate;
   a wetting agent;
   milled zircon;
   tabular alumina; and
   glass rock, said slurry having a viscosity of 10–14 sec. as measured by a #5 Zahn cup.

2. A water based slurry as set forth in claim 1, wherein the colloidal silica binder makes up 40% to 47% by volume of the slurry.

3. A water based slurry as set forth in claim 1, wherein the milled zircon is in the form of a 325 mesh flour.

4. A method for coating a wax model to form a shell utilizable in a lost wax investment casting technique, comprising the steps of:
   coating the wax model with at least one prime coat of a water based slurry containing a colloidal silica binder, milled zircon and tabular alumina;
   covering said at least one prime coat with a stucco of alundum sand;
   drying the at least one prime coat for at least four hours;
   coating the dried prime coat with a first backup coat of a water based slurry having a viscosity of 10–14 sec. as measured by a #5 Zahn cup, and containing a colloidal silica binder, milled zircon, tabular alumina and glass rock;
   drying the first backup coat for at least 5 hours;
   covering at least the first backup coat with tabular alumina;
   applying at least two additional backup coats of a water based slurry having a viscosity of 10–14 sec. as measured by a #5 Zahn cup, and containing a colloidal silica binder, milled zircon, tabular alumina and glass rock; and
   covering a first of the at least two additional backup coats with tabular alumina, and allowing at least 5 hours drying time between the application of a second of the said at least two backup coats.

* * * * *